United States Patent
Zhou et al.

(10) Patent No.: US 7,554,611 B2
(45) Date of Patent: Jun. 30, 2009

(54) METHOD AND APPARATUS OF BIDIRECTIONAL TEMPORAL NOISE REDUCTION

(75) Inventors: Zhi Zhou, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 709 days.

(21) Appl. No.: 11/110,336

(22) Filed: Apr. 19, 2005

(65) Prior Publication Data

US 2006/0232710 A1    Oct. 19, 2006

(51) Int. Cl.
*H04N 5/21* (2006.01)
*H04N 1/409* (2006.01)

(52) U.S. Cl. .................. 348/701; 348/607; 348/620; 375/240.15

(58) Field of Classification Search .......... 348/701, 348/700, 699, 607, 620, 452, 451; 375/240.16, 375/240.15, 240.27, 240.2; 382/236, 275
See application file for complete search history.

(56) References Cited

U.S. PATENT DOCUMENTS

| | | | |
|---|---|---|---|
| 6,037,986 A * | 3/2000 | Zhang et al. | 375/240.12 |
| 7,068,722 B2 * | 6/2006 | Wells | 375/240.16 |
| 2003/0039310 A1 * | 2/2003 | Wu et al. | 375/240.16 |
| 2003/0161407 A1 * | 8/2003 | Murdock et al. | 375/240.29 |
| 2006/0045181 A1 * | 3/2006 | Chen | 375/240.12 |

OTHER PUBLICATIONS

U.S. Appl. No. 11/025,173, filed Dec. 29, 2004, Zhou et al.
M. Lysaker, S. Osher, and X.C. Tai, *Noise Removal Using Smoothed Normals and Surface Fitting*, IEEE Trans. On Image Processing, Oct. 2004, pp. 1345-1357, vol. 13, No. 10.
A.B. Hamza and H. Krim, Image Denoising: A nonlinear robust statistical approach, IEEE Trans. On Signal Processing, Dec. 2001, pp. 3045-3054, vol. 49.

* cited by examiner

*Primary Examiner*—David L Ometz
*Assistant Examiner*—Jean W Désir
(74) *Attorney, Agent, or Firm*—Kenneth L. Sherman, Esq.; Michael Zarrabian, Esq.; Myers Andras Sherman LLP (57) ABSTRACT

A method of bidirectional temporal noise reduction in a video signal processing system is provided. A video signal comprising a video sequence of frames is received. Backward temporal noise reduction is performed on the sequence of frames to obtain backward noise-reduced frames. Then, forward temporal noise reduction is performed on the backward noise-reduced frames, to reduce noise in the video sequence of frames.

28 Claims, 6 Drawing Sheets

METHOD AND APPARATUS OF BIDIRECTIONAL TEMPORAL NOISE REDUCTION

FIELD OF THE INVENTION

The present invention relates generally to video processing, and more particularly to noise reduction in video sequences.

BACKGROUND OF THE INVENTION

In many video display systems such as TV sets, video enhancement by noise reduction is performed in order to obtain noise-free video sequences for display. Various noise reduction methods have been developed, but few are used in real products because such methods introduce unwanted artifacts into video frames. Most of the conventional noise reduction methods can be classified into three categories: spatial (2D) noise reduction, temporal noise reduction, and 3D noise reduction (i.e., combination of 2D and temporal noise reduction).

Spatial noise reduction applies a filter (with a small local window) to every pixel of the current video frame. Such a filter is usually regarded as a convolution filter based on a kernel. Examples of such a filter are the mean filter, the Gaussian filter, the median filter and the sigma filter. Mean filtering is the simplest, intuitive method for smoothing images and reducing noise, wherein the mean of a small local window is computed as the filtered result. Generally, a 3×3 square kernel is used, simplifying implementation. The mean filter, however, causes severe blurring of images.

Temporal noise reduction first examines motion information among the current video frame and its neighboring frames. It classifies pixels into motion region and non-motion region. In non-motion region, a filter is applied to the pixels in the current frame and its neighboring frames along the temporal axis. In motion region, the temporal filter is switched off to avoid motion blurring. Generally, temporal noise reduction is better in keeping the details and preserving edges than spatial noise reduction. Existing methods, however, introduce tailing effects.

BRIEF SUMMARY OF THE INVENTION

The present invention addresses the above shortcomings. In one embodiment, the present invention provides a method of bidirectional temporal noise reduction in a video signal processing system, comprising the steps of: inputting a video signal comprising a video sequence of frames; performing backward temporal noise reduction on the sequence of frames to obtain backward noise-reduced frames; and performing forward temporal noise reduction on the backward noise-reduced frames, thereby reducing noise in the video sequence of frames.

The step of performing backward temporal noise reduction comprises the steps of: applying temporal filtering to a current incoming frame and previous frames to obtain backward noise-reduced frames; and storing the backward noise-reduced frames in memory. Further, the step of performing forward temporal noise reduction comprises the steps of retrieving the backward noise-reduced frames from memory and performing forward temporal noise reduction on the retrieved backward-noise reduced frames, thereby reducing noise in the video sequence of frames. The step of performing forward temporal noise reduction can further comprise the steps of: applying temporal filtering to a current backward noise-reduced frame and future backward noise-reduced frames to obtain bidirectional noise-reduced frames; and outputting the bidirectional noise-reduced frames.

In addition, the steps of performing forward temporal noise reduction can further comprise the steps of: receiving the backward noise-reduced frames; computing point-wise motion decision signals in each backward noise-reduced frame; and performing motion-adaptive temporal filtering on that frame based on the motion decision signals and corresponding frames. The step of computing point-wise motion decision signals for each backward noise-reduced frame comprises the steps of: computing point-wise temporal local difference signals between a previous frame and a next frame in the sequence of backward noise-reduced frames; computing point-wise motion decision signals based on the corresponding temporal local difference signals and noise in the video sequence, wherein each point-wise motion decision signal is noise-adaptive.

The step of performing motion-adaptive temporal filtering comprises the steps of: generating weighting factors for the frames in the backward noise-reduced frames as a function of corresponding motion decision signals; and performing temporal filtering of the backward noise-reduced frames as a function the weighting factors.

In another aspect, the present invention provides a system (apparatus) that implements the above methods of the present invention.

Other embodiments, features and advantages of the present invention will be apparent from the following specification taken in conjunction with the following drawings.

DETAILED DESCRIPTION OF THE INVENTION

In one embodiment, the present invention provides a bidirectional temporal noise reduction method and system, described herein. In order to systematically describe the temporal noise reduction problem and the method of the present invention, let $g^t$ denote the incoming video frame at time instant t and $g_{i,j}^t$ denote the corresponding pixel value at the Cartesian coordinates (i, j) where i represents the ordinate and j represents the abscissa. Assume the input video sequence is corrupted by independent, identically distributed additive and stationary zero-mean Gaussian noise with variance $\sigma_0^2$. As such, any pixel $g_{i,j}^t$ can be denoted as $g_{i,j}^t = f_{i,j}^t + n_{i,j}^t$, where $f_{i,j}^t$ denotes the true pixel value without noise corruption and $n_{i,j}^t$ is the Gaussian distributed noise component. The noise variance $\sigma_0^2$ can be pre-detected by a separate noise estimate unit such as described by example in commonly assigned patent application Ser. No. 10/991,265, titled "Methods to estimation noise variance from a video sequence", filed Nov. 17, 2004 (incorporated herein by reference)

Accordingly, a noise reduction problem can be stated as a process to remove the corrupting noise from the video sequence. That is, for any pixel $g_{i,j}{}^t$, the noise reduction problem is to remove the noise component $n_{i,j}{}^t$ and estimate the true pixel value $f_{i,j}{}^t$. Denoting the estimated pixel value as $\hat{g}_{i,j}{}^t$ and the noise reduced frame as $\hat{g}^t$, temporal noise reduction involves first performing motion detection between neighboring frames to determine motion and non-motion regions in a frame. Then, the pixels in a non-motion region are filtered along temporal axis to remove said noise.

For clarity, in the description below, the example frame to be processed is denoted as the current frame. If motion detection is performed between the current frame and the previous frames, it is described as backward motion detection, and the corresponding noise reduction is described as backward temporal noise reduction. If motion detection is performed between the current frame and the next incoming frames, it is described as forward motion detection, and the corresponding noise reduction is described as forward temporal noise reduction. The forward temporal noise reduction requires frame delay.

Figure 1:
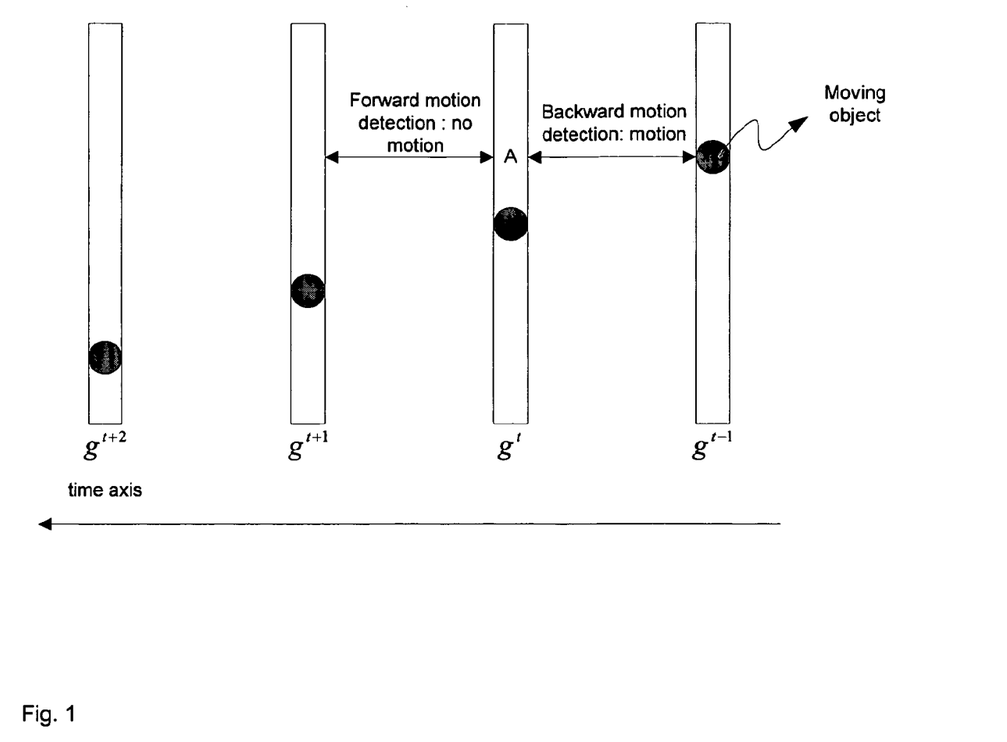
FIG. 1 shows an example pictorial description of the tailing effects in backward noise reduction.

An example in FIG. 1 shows a moving object in several consecutive frames. Assume frame $g^t$ is the current frame to be processed. Region A is detected as a motion region in backward motion detection, such that, it will not be filtered by backward temporal noise reduction. When the filtered video is played, it appears as noisy tailing following the moving object. Region A is detected as non-motion region in forward motion detection wherein tailing effects can be removed by forward temporal noise reduction. According to the present invention, a temporal noise reduction method that includes both backward and forward temporal noise reduction is termed a bidirectional temporal noise reduction, described by example in more detail below with reference to FIGS. 2-6.

Figure 2:
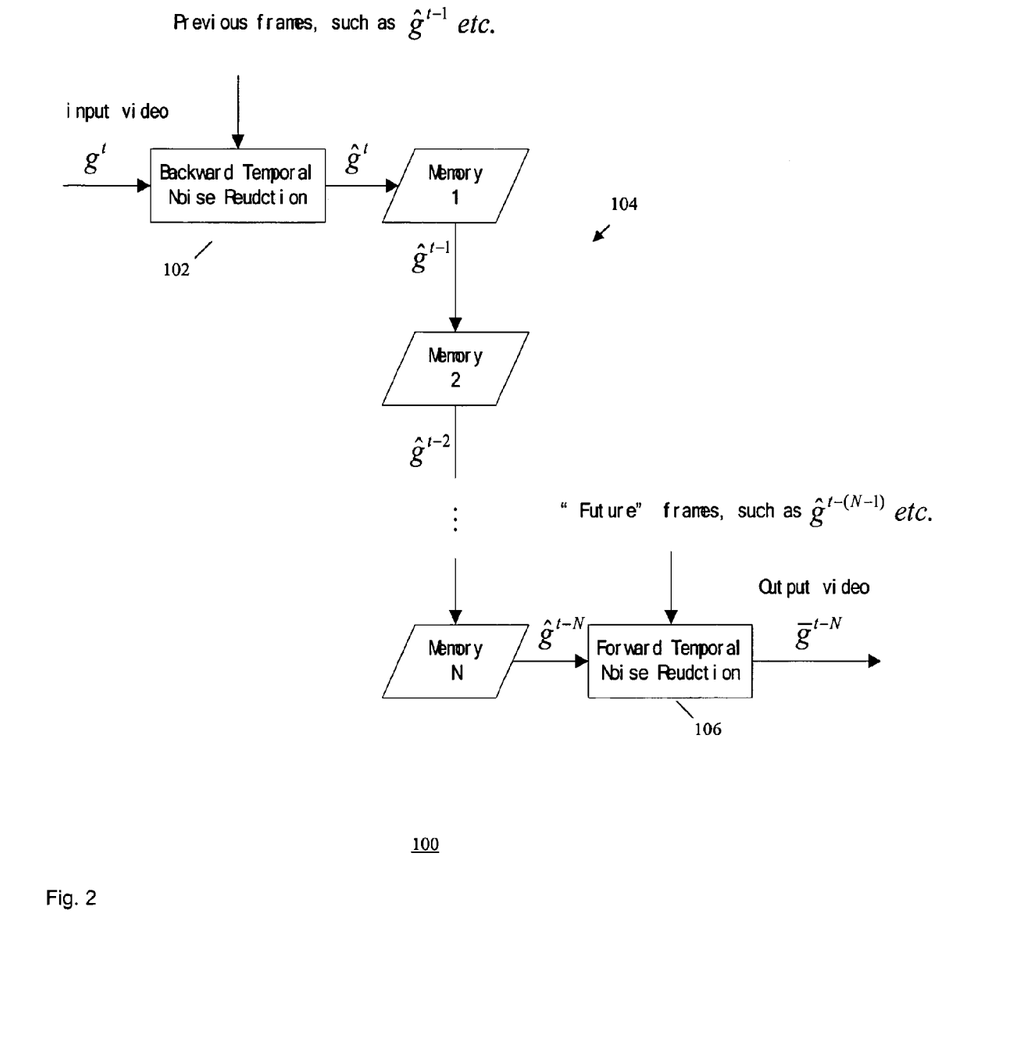
FIG. 2 shows a block diagram on an embodiment of a bidirectional temporal noise reduction system according to the present invention.

FIG. 2 shows a functional block diagram of an embodiment of a bidirectional temporal noise reduction system 100, according to the present invention. The system 100 comprises backward temporal noise reducer 102, memory array 104 and forward temporal noise reducer 106. The backward temporal noise reducer 102 applies backward temporal noise reduction to the current incoming frame $g^t$ to obtain the filtered frame $\hat{g}^t$ (i.e., backward noise-reduced frame). The previous filtered frame(s), such as $\hat{g}^{t-1}$, is (are) also fed into the backward temporal noise reducer 102 to enable temporal filtering of $g^t$ in backward direction. Those frames are selected based on the design of the backward temporal noise reducer 102. The current filtered frame $\hat{g}^t$ along with other previous filtered frames are saved into a frame memory array 104 (Memory 1 . . . Memory N). Without loss of generality, it is assumed that the farthest filtered frame in the frame memory array is $\hat{g}^{t-N}$.

The forward temporal noise reducer 106 applies forward temporal noise reduction to frame $\hat{g}^{t-N}$ to obtain the output video frame, denoted as $\bar{g}^{t-N}$ (i.e., bidirectional noise-reduced frame). The "future" backward-noise reduced frames (for time instant t−N), such as $\hat{g}^{t-(N-1)}$, $\hat{g}^{t-(N-2)}$ etc., are also fed into the forward temporal noise reducer 106 to enable temporal filtering of $\hat{g}^{t-N}$ in forward direction. Those frames are selected based on the design of the forward temporal noise reducer 106. Comparing the input and output time instant, there is an N-frame delay in the system 100.

In the example system 100, the type of backward or forward temporal noise reduction can be selected freely. The present invention provides a bidirectional temporal noise reduction method and system that can utilize various types of backward or forward temporal noise reduction.

Examples of backward noise reduction can be found in commonly assigned patent application titled "A method of temporal noise reduction in video sequences", attorney docket no. SAM2.PAU.50 (incorporated herein by reference).

Figure 3:
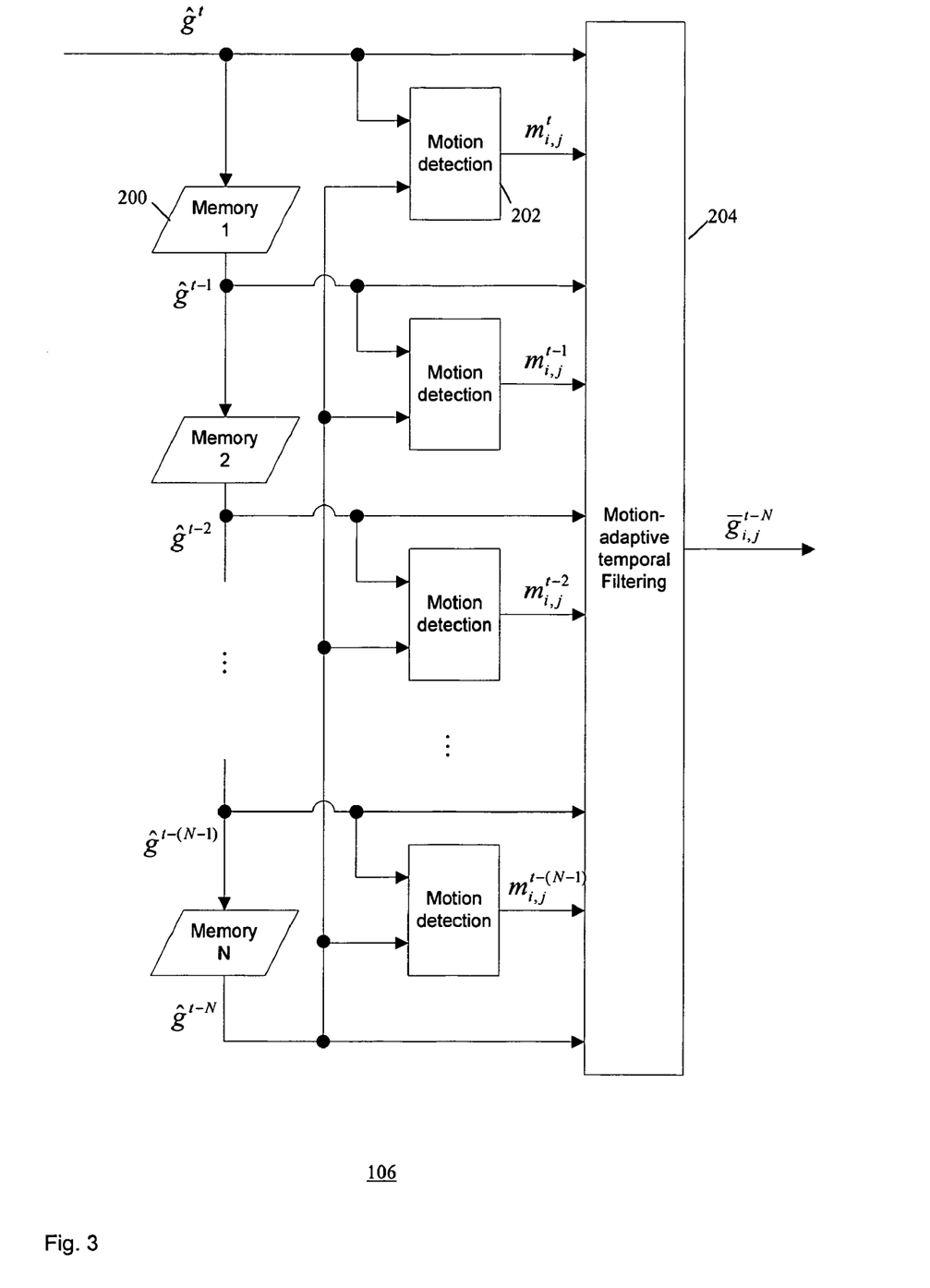
FIG. 3 shows a block diagram of an embodiment of a forward temporal noise reducer according to the present invention.
Figure 4A:
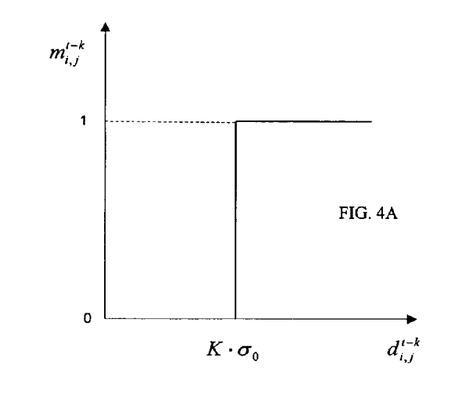
FIGS. 4A-F show examples of a noise-adaptive threshold function for motion decision signal calculation according to the present invention.
Figure 4B:
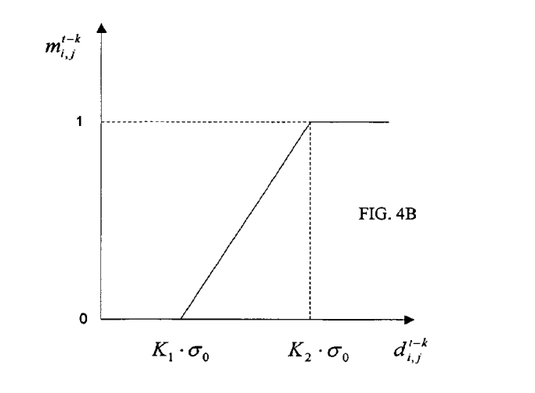
Figure 4C:
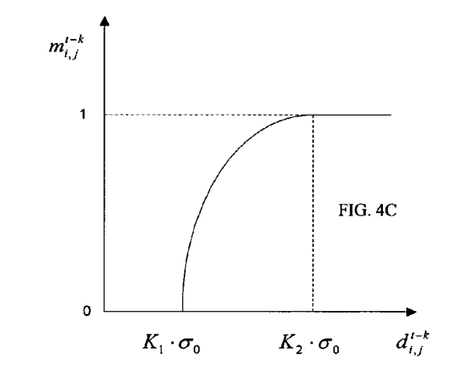
Figure 4D:
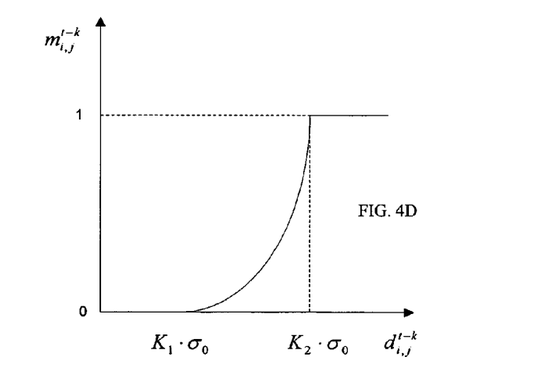
Figure 4E:
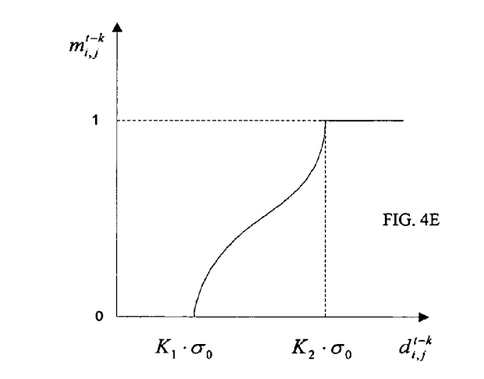
Figure 4F:
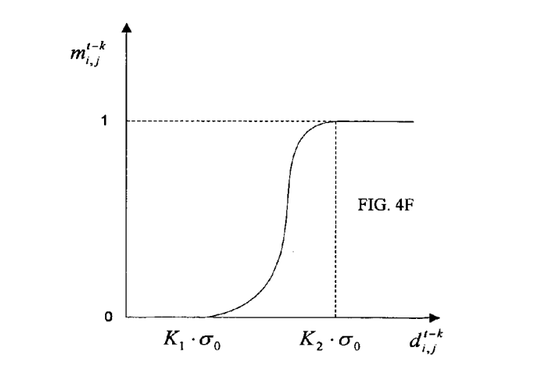

An example of the forward noise reduction is described below. FIG. 3 shows a block diagram of an embodiment of the forward noise reducer 106 of FIG. 2, which includes an array of N memory units 200 (Memory 1 . . . Memory N), an array of N motion detectors 202 and a motion-adaptive temporal filter 204. The memory units 200 store frames $\hat{g}^t$ . . . $\hat{g}^{t-N}$. To filter the pixel $\hat{g}_{i,j}{}^{t-N}$, the corresponding motion detector 202 estimates the motion decision signal $m_{i,j}{}^{t-k}$ (k=N−1, N−2, . . . , 0) between frames $\hat{g}^{t-N}$ and $\hat{g}^{t-k}$. A motion decision signal indicates the motion level of the corresponding pixels, such as motion ($m_{i,j}{}^{t-k}=1$) or no motion ($m_{i,j}{}^{t-k}=0$). In a non-motion region, temporal filtering is performed by the motion-adaptive temporal filter 204 to remove noise.

An example of motion detection method is described in commonly assigned patent application entitled "Method and System of Noise-Adaptive Motion detection in an Interlaced Video Sequence", Attorney Docket SAM2.PAU.51, incorporated herein by reference. In an example implementation of a motion detector 202, first, the point-wise temporal local difference signals are calculated by computing the absolute difference between frames $\hat{g}^{t-N}$ and $\hat{g}^{t-k}$ as $D^{t-k}=|\hat{g}^{t-N}-\hat{g}^{t-k}|$ and low-pass filtering the absolute difference as $d^{t-k}=LPF(D^{t-k})$, where LPF(•) represents a low pass filtering process over the input video signal. The V×H kernel, $\Lambda_{V \times H}$, in general, of the low-pass filter, LPF(•), can be expressed as $$\Lambda_{V \times H} = \begin{bmatrix} \lambda_{11} & \lambda_{12} & \cdots & \lambda_{1H} \\ \lambda_{21} & \lambda_{22} & \cdots & \lambda_{2H} \\ \vdots & \vdots & \ddots & \vdots \\ \lambda_{V1} & \lambda_{V2} & \cdots & \lambda_{VH} \end{bmatrix}$$

where $(\lambda_{11}, \ldots, \lambda_{VH})$ represents a set of predetermined normalized coefficients $$\left(\text{i.e., } \sum_{p=1}^{V} \sum_{q=1}^{H} \lambda_{p,q} = 1\right).$$

Then, each point-wise motion decision signal is computed as $m_{i,j}{}^{t-k}=T(d_{i,j}{}^{t-k})$ where T(•) denotes a noise-adaptive threshold function. The implementation is based on the assumption that the larger the temporal local difference is, the higher the value of the motion decision signal. Therefore, T(•) is a monotonically increasing function. FIGS. 4A-F show six examples of T(•), where K, $K_1$, and $K_2$ are constant values. Note that, in these examples, thresholds $K\sigma_0$, $K_1\sigma_0$, $K_2\sigma_0$ are automatically adjusted according to the noise standard deviation of the video sequence ($\sigma_0$ is noise standard deviation). Robust performance thus can be obtained against the noise.

Figure 5:
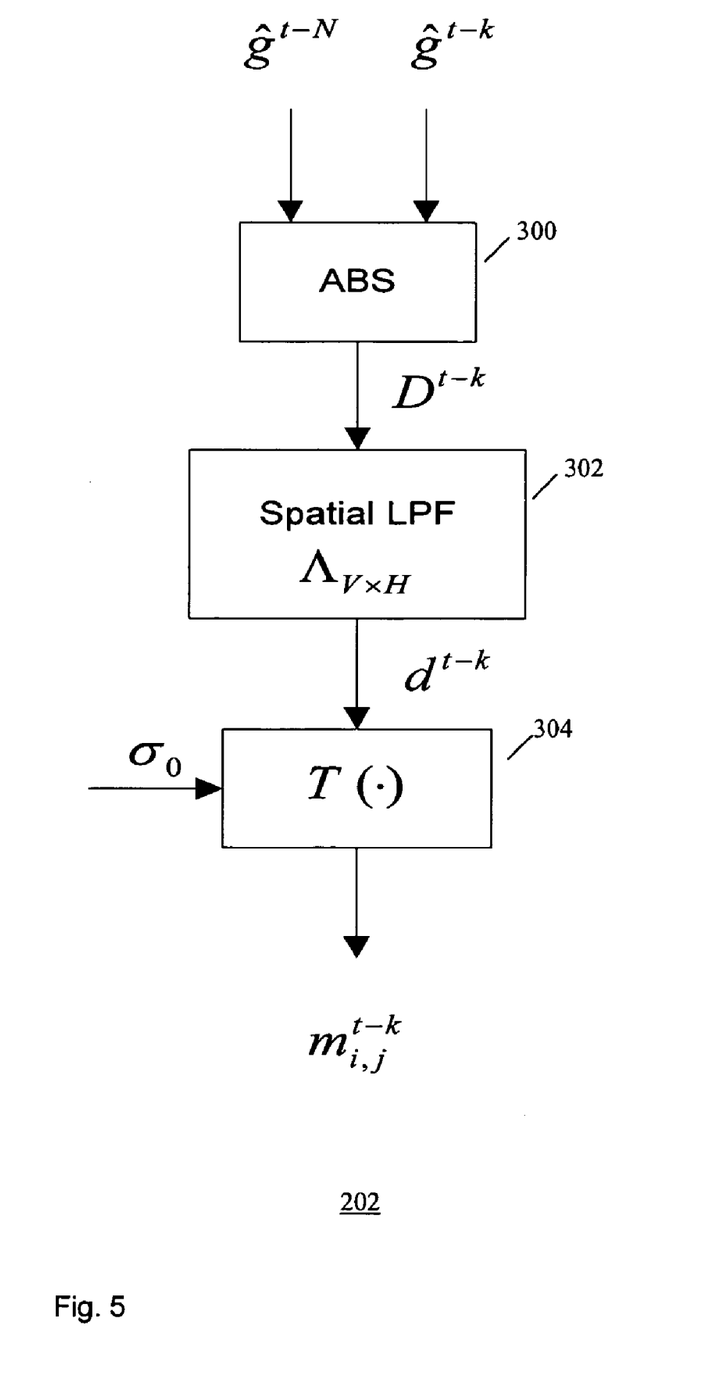
FIG. 5 shows a block diagram of an embodiment of a motion detection calculator according to the present invention.

FIG. 5 shows a block diagram of an implementation of a motion detector 202 (FIG. 3) that calculates the motion decision signal $m_{i,j}{}^{t-k}$. In the FIG. 5, the absolute value of the frame difference between the frames $\hat{g}^{t-N}$ and $\hat{g}^{t-k}$ is determined by an ABS unit 300 that generates $D^{t-k}$ as the frame difference signal. The frame difference signal is then lowpass filtered by a Spatial LPF 302 to generate $d^{t-k}=LPF(D^{t-k})$, using V×H kernel ($\Lambda_{V \times H}$, in general). Then, the point-wise motion decision signal is computed as $m_{i,j}^{t-k}=T(d_{i,j}^{t-k})$ in a threshold function processor 304 implementing the function $T(\cdot)$.

According to another aspect of the present invention, to temporally filter the pixel $\hat{g}_{i,j}^{t-N}$ in the motion-adaptive temporal filter 204 (FIG. 3), a weight factor $w_{i,j}^{t-k}$ for pixel $\hat{g}_{i,j}^{t-k}$ is computed based on the assumption that the larger the motion level is, the smaller the weight. Therefore, in this example, the weight $w_{i,j}^{t-k}$ is a monotonically decreasing function of $m_{i,j}^{t-k}$. A simple implementation can be $w_{i,j}^{t-k}=1-m_{i,j}^{t-k}$. Other implementations are also possible. The temporal filtering of the pixel $\hat{g}_{i,j}^{t-N}$ in the motion-adaptive temporal filter 204 can therefore be implemented, for example, by computing $$\overline{g}_{i,j}^{t-N} = \frac{\hat{g}_{i,j}^{t-N} + \sum_{k=0}^{N-1} w_{i,j}^{t-k} \cdot \hat{g}_{i,j}^{t-k}}{1 + \sum_{k=0}^{N-1} w_{i,j}^{t-k}},$$

wherein $\overline{g}^{t-N}$ represents temporally filtered output frame from the filter 204.

To further improve performance of the above forward temporal noise reduction method, the following modifications can be made. If an obtained motion decision signal, denoted as $m_{i,j}^{t-r}$ ($0 \leq r \leq N-1$), is very large when there is motion between the pixels $\hat{g}_{i,j}^{t-r}$ and $\hat{g}_{i,j}^{t-N}$, other "future" pixels $\hat{g}_{i,j}^{t-k}$ (k=r−1, r−2, ..., 0) should also be detected as having motion. Therefore, if $m_{i,j}^{t-r}$ is greater than a threshold, $w_{i,j}^{t-k}$ (k=r−1, r−2, ..., 0) are set to 0 without computing the corresponding motion decision signals.

The following steps can further reduce computational complexity. In backward temporal noise reduction, motion detection is performed between the frames $g^t$ and $\hat{g}^{t-1}$. The number of pixels without motion along temporal axis can be accumulated as $r_{i,j}^t$. The value $r_{i,j}^t$ can be updated as $$r_{i,j}^t = \begin{cases} 0 & \theta_{i,j}^t > \theta_0, \\ \min(r_{i,j}^{t-1} + 1, M) & \theta_{i,j}^t \leq \theta_0, \end{cases}$$

where $\theta_{i,j}^t$ is the obtained motion decision signal, $\theta_0$ is a threshold to determine if there is motion ($\theta_{i,j}^t > \theta_0$) or no motion ($\theta_{i,j}^t \leq \theta_0$), M is a constant integer satisfying $M \geq N$. Note that, the threshold $\theta_0$ can be a constant value or a noise-adaptive value.

Figure 6:
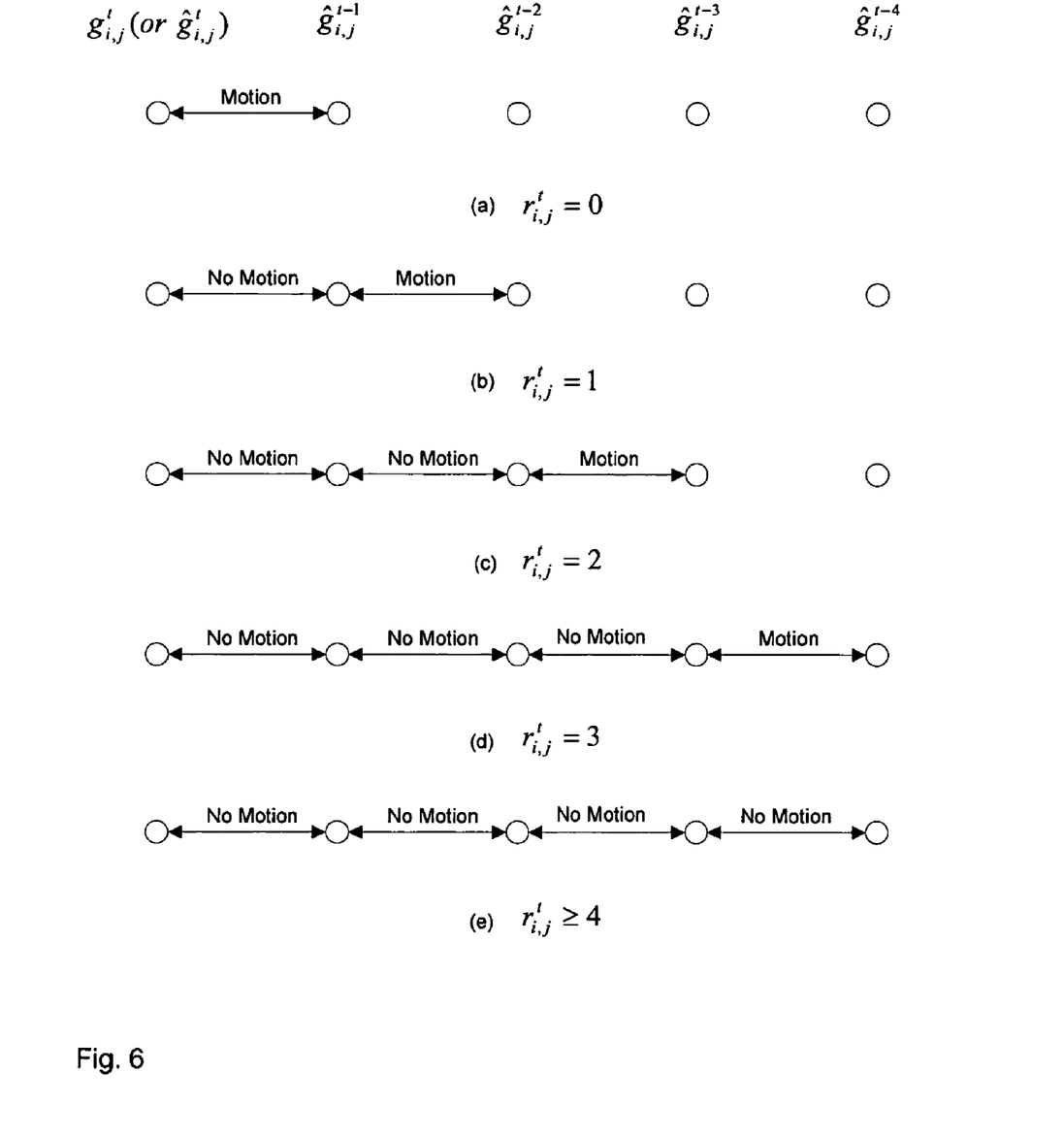
FIG. 6 shows examples of motion information according to the present invention.

FIG. 6 shows examples of motion information indicated by the value $r_{i,j}^t$ when N=4. It can be derived that if $r_{i,j}^t \geq N$, there is no motion among the pixels $\hat{g}_{i,j}^{t-k}$ (k=N, N−1, ..., 0), such that, the forward temporal noise reduction can be simply applied as $$\overline{g}_{i,j}^{t-N} = \begin{cases} \hat{g}_{i,j}^{t-N} & r_{i,j}^t < N, \\ \dfrac{1}{N+1} \sum_{k=0}^{N} \hat{g}_{i,j}^{t-N} & r_{i,j}^t \geq N. \end{cases}$$

Using this method, no motion detection is required in forward temporal noise reduction.

In alternative embodiment of the above example implementations of the forward temporal noise reduction, the original frame $g^t$ can be used instead of the frame $\hat{g}^t$ in temporal filtering the frame $\hat{g}^{t-N}$. Thus, the steps of the corresponding bidirectional temporal noise reduction should be modified as:

(1) Receiving the original incoming frame $g^t$;

(2) Filtering the frame $\hat{g}^{t-N}$ using forward temporal noise reduction and outputting the filtered frame to the next video processing unit;

(3) Discarding the frame $\hat{g}^{t-N}$ from the frame memory array; and (4) Filtering the frame $g^t$ using the backward temporal noise reduction and saving the filtered frame to the memory (by doing so, one frame memory can be saved).

Note that, the present invention can be applied to both progressive and interlaced videos. The even and odd fields in an interlaced video can be processed as two separate progressive video sequences, or the fields can be merged into a single frame prior to be processed.

The present invention has been described in considerable detail with reference to certain preferred versions thereof; however, other versions are possible. Therefore, the spirit and scope of the appended claims should not be limited to the description of the preferred versions contained herein.

What is claimed is:

1. In a video signal processing system, a method of bidirectional temporal noise reduction, comprising:
    inputting a video signal comprising a video sequence of frames;
    performing backward temporal noise reduction on a current incoming frame to obtain a backward noise-reduced frame; and
    performing forward temporal noise reduction on the backward noise-reduced frame, thereby reducing noise in the video sequence of frames,
    wherein performing forward temporal noise reduction comprises:
    receiving the backward noise-reduced frames;
    computing point-wise motion decision signals for each backward noise-reduced frame; and
    performing motion-adaptive temporal filtering based on the motion decision signals and corresponding frames.

2. The method of claim 1 wherein the step of performing backward temporal noise reduction comprises the steps of:
    applying temporal filtering to a current incoming frame and previous frames to obtain backward noise-reduced frames; and
    storing the backward noise-reduced frames in memory.

3. The method of claim 1 wherein the step of performing forward temporal noise reduction comprises the steps of retrieving the backward noise-reduced frames from memory and performing forward temporal noise reduction on the retrieved backward-noise reduced frames, thereby reducing noise in the video sequence of frames.

4. The method of claim 1 wherein the step of performing forward temporal noise reduction comprises the steps of:
    applying temporal filtering to a current backward noise-reduced frame and future frames relative to the current backward noise-reduced frames, to obtain bidirectional noise-reduced frames;
    outputting the bidirectional noise-reduced frames.

5. The method of claim 1 wherein the step of computing point-wise motion decision signals for each backward noise-reduced frame comprises the steps of:
    computing point-wise temporal local difference signals between a previous frame and a next frame in the sequence of backward noise-reduced frames;

computing point-wise motion decision signals based on the corresponding temporal local difference signals and noise in the video sequence, wherein each motion decision signal is noise-adaptive.

6. The method of claim 1 wherein the step of performing motion-adaptive temporal filtering comprises the steps of:
generating weighting factors for the frames in the backward noise-reduced frames as a function of corresponding motion decision signals;
performing temporal filtering of the backward noise-reduced frames as a function of the weighting factors.

7. The method of claim 6 wherein the weighting factors are monotonically decreasing functions of the motion decision signals.

8. The method of claim 6 wherein the step of performing temporal filtering of the backward noise-reduced frames as a function of the weighting factors comprises computing $$\overline{g}_{i,j}^{t-N} = \frac{\hat{g}_{i,j}^{t-N} + \sum_{k=0}^{N-1} w_{i,j}^{t-k} \cdot \hat{g}_{i,j}^{t-k}}{1 + \sum_{k=0}^{N-1} w_{i,j}^{t-k}}$$

wherein N is the number of backward noise-reduced frames,
i and j define a spatial location of the respective video signal value in a cartesian matrix, t is the instant time,
$\hat{g}_{i,j}^{t-N}$ is a pixel at Cartesian location i, j in a backward noise-reduced frame at time t−N,
$\hat{g}_{i,j}^{t-k}$ is a pixel at Cartesian location i, j in a backward noise-reduced frame at time t−k,
$w_{i,j}^{t-k}$ is the weighting factor for pixel $\hat{g}_{i,j}^{t-k}$, and
$\overline{g}_{i,j}^{t-N}$ is a pixel at Cartesian location i, j in a bidirectional noise-reduced frame at time t−N.

9. The method of claim 8 further comprising the steps of:
if the value of the motion decision signal $m_{i,j}^{t-r}$ is greater than a threshold for pixels between $\hat{g}_{i,j}^{t-r}$ and $\hat{g}_{i,j}^{t-N}$, then designating pixels $\hat{g}_{i,j}^{t-k}$ (k=r−1, r−2, . . . , 0) as having motion without computing the corresponding motion decision signals.

10. The method of claim 8 further comprising the steps of, in backward temporal noise reduction, wherein motion detection is performed between the frames $g^t$ and $\hat{g}^{t-1}$, accumulating the number of pixels without motion along temporal axis as $r_{i,j}^t$, where:

$$r_{i,j}^t = \begin{cases} 0 & \theta_{i,j}^t > \theta_0, \\ \min(r_{i,j}^{t-1} + 1, M) & \theta_{i,j}^t \leq \theta_0, \end{cases}$$

wherein $\theta_{i,j}^t$ is the obtained motion decision signal, $\theta_0$ is a threshold to determine if there is motion ($\theta_{i,j}^t > \theta_0$) or no motion ($\theta_{i,j}^t \leq \theta_0$), and M is a constant integer satisfying M≧N.

11. The method of claim 10 wherein the threshold $\theta_0$ is a constant.

12. The method of claim 10 wherein the threshold $\theta_0$ is a noise-adaptive value.

13. The method of claim 10 wherein if $r_{i,j}^t \geq N$, there is no motion among the pixels $\hat{g}_{i,j}^{t-k}$ (k=N, N−1, . . . , 0), such that the forward temporal noise reduction can be applied as:

$$\overline{\hat{g}}_{i,j}^{t-N} = \begin{cases} \hat{g}_{i,j}^{t-N} & r_{i,j}^t < N, \\ \frac{1}{N+1} \sum_{k=0}^{N} \hat{g}_{i,j}^{t-N} & r_{i,j}^t \geq N \end{cases}$$

whereby no motion detection is required in forward temporal noise reduction.

14. In a video signal processing system, an apparatus for performing bidirectional temporal noise reduction, comprising:
an input for receiving a video signal comprising a video sequence of frames;
a backward temporal noise reducer for performing backward temporal noise reduction on a current frame to obtain a backward noise-reduced frame; and
a forward temporal noise reducer for performing forward temporal noise reduction on the backward noise-reduced frame, thereby reducing noise in the video sequence of frames,
wherein the forward temporal noise reducer comprises:
motion decision signal calculation means for computing point-wise motion decision signals for each backward noise-reduced frame; and
motion-adaptive temporal filtering means for performing motion-adaptive temporal filtering based on the motion decision signals and corresponding frames.

15. The apparatus of claim 14 wherein the backward temporal noise reducer comprises a temporal filter for temporally filtering a current incoming frame to obtain a backward noise-reduced frame.

16. The apparatus of claim 14 wherein the backward temporal noise reducer comprises:
temporal filter for temporally filtering a current incoming frame and previous frames to obtain backward noise-reduced frames; and
memory for storing the backward noise-reduced frames.

17. The apparatus of claim 16 wherein forward temporal noise reducer retrieves the backward noise-reduced frames from memory and performs forward temporal noise reduction on the retrieved backward-noise reduced frames, thereby reducing noise in the video sequence of frames.

18. The apparatus of claim 14 wherein the forward temporal noise reducer comprises:
a temporal filter for temporally filtering a current backward noise-reduced frame and future backward noise-reduced frames to obtain bidirectional noise-reduced frames; and
an output for outputting the bidirectional noise-reduced frames.

19. The apparatus of claim 14 wherein the motion decision signal calculation means comprises:
means for computing point-wise temporal local difference signals between a previous frame and a next frame in the sequence of backward noise-reduced frames;
means for computing point-wise motion decision signals based on the corresponding temporal local difference signals and noise in the video sequence, wherein each motion decision signal is noise-adaptive.

20. The apparatus of claim 14 wherein the motion-adaptive temporal filtering means comprises:
means for generating weighting factors for the frames in the backward noise-reduced frames as a function of corresponding motion decision signals;

temporal filtering means for performing temporal filtering of the backward noise-reduced frames as a function of the weighting factors.

21. The apparatus of claim 20 wherein the weighting factors are monotonically decreasing functions of the motion decision signals.

22. The apparatus of claim 20 wherein the temporal filtering means performs temporal filtering of the backward noise-reduced frames as a function of the weighting factors by computing $$\overline{g}_{i,j}^{t-N} = \frac{\hat{g}_{i,j}^{t-N} + \sum_{k=0}^{N-1} w_{i,j}^{t-k} \cdot \hat{g}_{i,j}^{t-k}}{1 + \sum_{k=0}^{N-1} w_{i,j}^{t-k}}$$

wherein N is the number of backward noise-reduced frames,
i and j define a spatial location of the respective video signal value in a Cartesian matrix, t is the instant time,
$\hat{g}_{i,j}^{t-N}$ is a pixel at Cartesian location i, j in a backward noise-reduced frame at time t−N,
$\hat{g}_{i,j}^{t-k}$ is a pixel at Cartesian location i, j in a backward noise-reduced frame at time t−k,
$w_{i,j}^{t-k}$ is the weighting factor for pixel $\hat{g}_{i,j}^{t-k}$, and
$\overline{g}_{i,j}^{t-N}$ is a pixel at Cartesian location i, j in a bidirectional noise-reduced frame at time t−N.

23. The apparatus of claim 22 wherein if the value of the motion decision signal $m_{i,j}^{t-r}$ is greater than a threshold for pixels between $\hat{g}_{i,j}^{t-r}$ and $\hat{g}_{i,j}^{t-N}$, then pixels $\hat{g}_{i,j}^{t-k}$ (k=r−1, r−2, ..., 0) are designated as having motion without computing the corresponding motion decision signals.

24. The apparatus of claim 23 wherein in the backward temporal noise reducer where motion detection is performed between the frames $g^t$ and $\hat{g}^{t-1}$, the number of pixels without motion along temporal axis is accumulated as $r_{i,j}^t$, where:

$$r_{i,j}^t = \begin{cases} 0 & \theta_{i,j}^t > \theta_0, \\ \min(r_{i,j}^{t-1} + 1, M) & \theta_{i,j}^t \leq \theta_0, \end{cases}$$

wherein $\theta_{i,j}^t$ is the obtained motion decision signal, $\theta_0$ is a threshold to determine if there is motion ($\theta_{i,j}^t > \theta_0$) or no motion ($\theta_{i,j}^t \leq \theta_0$), and M is a constant integer satisfying M≧N.

25. The apparatus of claim 24 wherein the threshold $\theta_0$ is a constant.

26. The apparatus of claim 24 wherein the threshold $\theta_0$ is a noise-adaptive value.

27. The apparatus of claim 24 wherein if $r_{i,j}^t \geq N$, there is no motion among the pixels $\hat{g}_{i,j}^{t-k}$ (k=N, N−1, ..., 0), such that the forward temporal noise reduction can be applied as:

$$\hat{g}_{i,j}^{t-N} = \begin{cases} g_{i,j}^{t-N} & r_{i,j}^t < N, \\ \dfrac{1}{N+1} \sum_{k=0}^{N} \hat{g}_{i,j}^{t-k} & r_{i,j}^t \geq N \end{cases}$$

whereby no motion detection is required in forward temporal noise reduction.

28. In a video signal processing system, a method of bidirectional temporal noise reduction for a sequence of video frames, comprising the steps of:
receiving a video signal comprising an original video frame $g^t$ at time t;
maintaining in memory a sequence of back-ward noise reduced frames $\hat{g}^{t-1} \ldots \hat{g}^{t-N}$ that are obtained by performing backward temporal noise reduction filtering on current frames $g^{t-1} \ldots g^{t-N}$, respectively;
filtering the back-ward noise reduced frame $\hat{g}^{t-N}$ using forward temporal noise reduction to generate the output frame $\overline{g}^{t-N}$, and discarding the frame $\hat{g}^{t-N}$ from memory; and
performing backward temporal noise reduction on frame $g^t$ to obtain a back-ward noise reduced frame $\hat{g}^t$, and storing the frame $\hat{g}^t$ in memory;
thereby reducing noise in the video sequence of frames.

* * * * *